C. A. BODDIE.
AMPERE HOUR METER.
APPLICATION FILED APR. 4, 1916.
1,303,243.
Patented May 13, 1919.
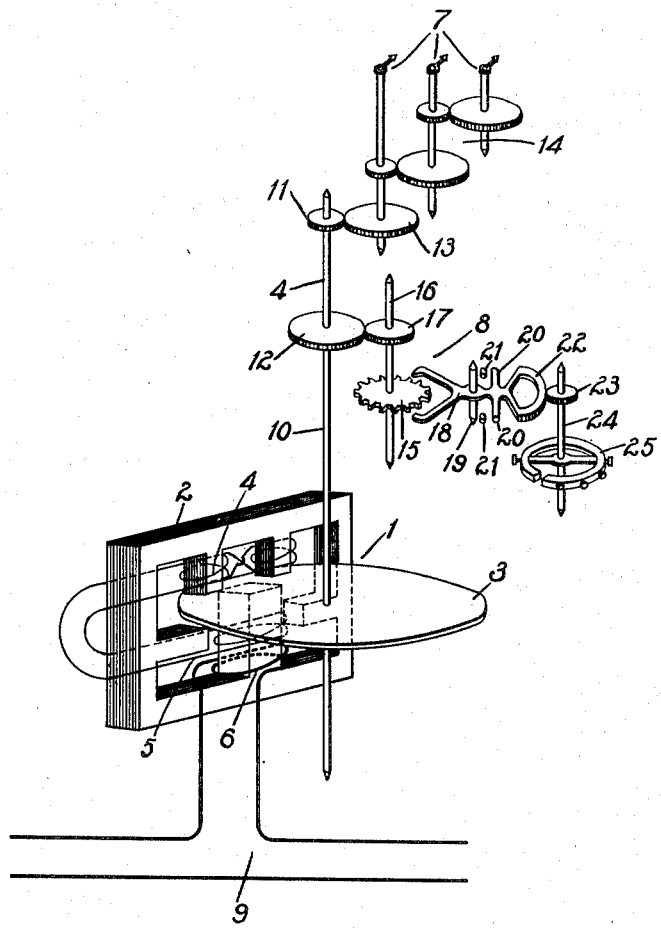
WITNESSES:
R. J. Fitzgerald.
J. H. Proctor
INVENTOR
Clarence A. Boddie.
BY
Wesley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

AMPERE-HOUR METER.

1,303,243.   Specification of Letters Patent.   Patented May 13, 1919.

Application filed April 4, 1916.   Serial No. 88,974.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Ampere-Hour Meters, of which the following is a specification.

My invention relates to electrical-measuring instruments and particularly to ampere-hour meters.

One object of my invention is to provide an ampere-hour meter that shall rotate in substantially direct proportion to the current traversing its windings.

Another object of my invention is to provide an escapement device for the movable member of a meter of the above indicated character that shall oscillate in accordance with the force applied to its escapement wheel.

I provide an escapement or controlling device that has means for so damping or retarding the movement of the movable member of an ampere-hour meter that it is adapted to rotate substantially in accordance with the first power of the current traversing its windings.

The single figure of the accompanying drawing is a diagrammatic view of an ampere-hour meter embodying my invention.

The present ampere-hour meter 1 comprises a stationary magnetizable core member 2, an armature 3, a main winding 6, auxiliary windings 4 and 5, integrating pointers 7 and an escapement device 8. The winding 6 is connected to an electrical circuit 9 and surrounds a portion of the magnetizable core member 2. The winding 5 is wound on the same portion of the magnetizable core that is surrounded by the winding 6 and is connected in closed-circuit relation to the winding 4 which surrounds other portions of the magnetizable core member 2. The armature 3 is mounted on a shaft 10 upon which a pinion 11 and a gear wheel 12 are also mounted. The pinion 11 is adapted to engage a gear wheel 13 that constitutes a part of an integrating mechanism 14. The pointers 7 are operatively connected to the integrating mechanism 14 for the purpose of coöperating with scales (not shown) to indicate the number of ampere-hours to be measured.

The escapement device 8 comprises an escapement wheel 15 that is mounted on a shaft 16 upon which a pinion 17 is also mounted. The pinion 17 engages the gear wheel 12 and, consequently, the escapement wheel 15 is subjected to a force or turning moment substantially proportional to the turning moment of the armature 3. A double pallet 18 is pivoted on a shaft 19 and is provided with a mutilated gear wheel or segment 22 and with stops 20 that coöperate with stationary members 21 to limit its movement. The gear wheel 22 engages a pinion 23 that is mounted on a shaft 24. A balance wheel 25 is also mounted on the shaft 24 but is not restrained by a spring as is the case in ordinary escapement devices of the clock type.

Since the windings 4, 5 and 6 coöperate to actuate the armature 3, it will have a turning moment or force in accordance with the square of the current traversing the circuit 9. This turning force is transmitted to the escapement wheel 15. However, the escapement device 8 is so constructed that it will oscillate in accordance with the square-root of the force applied to the wheel 15 divided by two times the product of the mass of the balance wheel 25 and the distance moved by the double pallet 18, or $$N = \sqrt{\frac{F}{2MS}}$$

where N is the number of oscillations of the double pallet 18, F is the force supplied to the wheel 15 or $I^2$, I is the current traversing the circuit 9, M is the mass of the moving parts of the escapement device 8 and S is the distance moved by the double pallet 18. Thus, if F is equal to $I^2$, then N equals K×I, where $$K = \sqrt{\frac{1}{2MS}}$$

Therefore, the armature 3 will be permitted to turn in accordance with the current traversing the circuit 9, since it will be permitted to turn an amount controlled by the number of oscillations of the double pallet 18.

I do not limit my invention to the particular form of escapement device illustrated, as many modifications may be made therein without departing from the spirit and scope of the invention as set forth in the appended claims.

I claim as my invention:

1. The combination with an electro-responsive device having a torque proportional to the square of the applied energy, of an escapement device for so retarding the movement of the electro-responsive device that it rotates in accordance with the energy applied.

2. In a meter, the combination with a movable member having a tendency to rotate at a speed greater than the first power of the current, of an escapement device having a non-retarded member for so retarding the movable member of the meter that it will rotate in substantially direct proportion to the current supplied to the meter.

3. In an ampere-hour meter, the combination with a movable member having a tendency to rotate in accordance with the square of the current to be measured, of an escapement device for so retarding the movement of the movable member that it rotates in accordance with the current to be measured.

4. In an ampere-hour meter, the combination with a movable member adapted to have a torque that varies in accordance with the square of the current to be measured, of an escapement device for so retarding the movement of the movable member that it rotates in accordance with the current to be measured.

5. In an ampere-hour meter, the combination with a movable member adapted to have a torque that varies in accordance with the square of the current to be measured, of an escapement device for so retarding the movement of the movable member that it rotates substantially in direct proportion to the current to be measured.

6. In a meter, the combination with a winding and a movable member adapted to have a torque that varies in accordance with the square of the current traversing the winding, of an escapement device operatively connected to the movable member and adapted to retard its movement substantially in accordance with the square of the current traversing the winding.

7. An escapement device comprising an escapement wheel, a double pallet therefor and a balance wheel for the double pallet, said balance wheel being so unrestrained as to permit the double pallet to oscillate in proportion to the square root of the turning force on the escapement wheel.

8. An escapement device comprising an escapement wheel, a double pallet therefor and a non-restrained balance wheel for the double pallet, said balance wheel being adapted to permit the double pallet to oscillate in proportion to the square root of the turning force on the escapement wheel divided by the distance of free movement of the double pallet.

9. An escapement device comprising an escapement wheel, a double pallet for the escapement wheel and a balance wheel permanently connected to the double pallet, said double pallet having means for limiting its movement in both directions, the said double pallet, escapement wheel and balance wheel being adapted to permit the pallet to oscillate in proportion to the square root of the turning force on the escapement wheel divided by the product of the mass of the balance wheel and the distance moved by the double pallet.

10. In an ampere-hour meter, the combination with an actuating winding and a movable member adapted to have a torque that varies in accordance with the square of the current traversing the winding, of an escapement device having a non-spring-restrained balance wheel for so retarding the movement of the movable member that it rotates in accordance with the current traversing the winding.

11. The combination with a movable member, and means for actuating the same in accordance with the square of the applied energy, of an escapement device operatively connected to the movable member for retarding the movable member in accordance with its speed.

12. The combination with a movable member, and means for actuating the same in accordance with the square of the applied energy, of an escapement device operatively connected to the movable member and having a non-restrained balance wheel for retarding the movement of the movable member in accordance with its speed.

13. The combination with a winding and a movable member adapted to be actuated in accordance with the square of the current traversing the winding, of an escapement wheel connected to the movable member, a double pallet for the escapement wheel, and means for causing the double pallet to oscillate in proportion to the square root of the turning force on the escapement wheel.

14. The combination with a winding and a movable member adapted to be actuated in accordance with the square of the current traversing the winding, of an escapement wheel connected to the movable member, a double pallet for the escapement wheel and a non-spring-restrained balance wheel for the double pallet.

In testimony whereof, I have hereunto subscribed my name this 27th day of March, 1916.

CLARENCE A. BODDIE.